UNITED STATES PATENT OFFICE.

JAMES DEWITT, OF KANSAS CITY, MISSOURI, ASSIGNOR TO HIMSELF, JOHN S. McCRUM, BENJAMIN S. HENNING, HENRY J. FISHER, AND SANDERS DEWITT.

IMPROVEMENT IN FIRE-PROOF PAINTS.

Specification forming part of Letters Patent No. 170,533, dated November 30, 1875; application filed October 8, 1875.

*To all whom it may concern:*

Be it known that I, JAMES DEWITT, of Kansas city, Jackson county, Missouri, have invented a new and useful Paint, of which the following is a specification:

My invention relates to a new and useful composition for a paint, which combines the advantages of affording perfect protection against atmospheric influences on any surface, whether of wood, stone, or metal, and of rendering wooden structures completely fire-proof. My paint is further wholly free from any tendency to crack, blister, or peel off; nor is it liable to melt, or to assume a tacky or semi-fluid condition under the action of heat.

The several ingredients of my paint are, before being brought together, heated to a temperature of about 200° Fahrenheit.

I take forty-six gallons of coal-tar, and warm the same in a kettle of suitable capacity, and mix therewith the following ingredients: Three pounds of lamp-black, dissolved in ten quarts of crude spirits of turpentine; one pound gum-copal, dissolved in two quarts crude spirits of turpentine; twenty-five pounds of common salt; one pound of concentrated lye, (such as manufactured by the American Lye Company, of Philadelphia.)

The above being well mingled, I add, and thoroughly mix therewith, shortly before using, twenty-five pounds of hydraulic cement, in a caustic and finely-pulverized condition.

Venetian red, chrome, or other pigment may be employed in place of the lamp-black.

I claim—

The described composition of coal-tar, lamp-black, gum-copal, turpentine, salt, lye, and hydraulic cement, substantially in the proportions and compounded as set forth.

In testimony of which invention I hereunto set my hand.

JAMES DEWITT.

Attest:
    GEO. H. KNIGHT,
    W. J. FERREY.